No. 776,008. PATENTED NOV. 29, 1904.
W. W. BARNES.
TOOTHPICK.
APPLICATION FILED AUG. 1, 1901.
NO MODEL.

WITNESSES:
Leon Grannan
Ora F. Neef

INVENTOR
W. W. Barnes
BY
Abraham Knobel
ATTORNEY

No. 776,008. Patented November 29, 1904.

UNITED STATES PATENT OFFICE.

WILLIS WILKINS BARNES, OF LOUISVILLE, KENTUCKY, ASSIGNOR TO ABRAHAM KNOBEL AND F. H. KAPPA, OF LOUISVILLE, KENTUCKY.

TOOTHPICK.

SPECIFICATION forming part of Letters Patent No. 776,008, dated November 29, 1904.

Application filed August 1, 1901. Serial No. 70,532. (No model.)

*To all whom it may concern:*

Be it known that I, WILLIS WILKINS BARNES, a citizen of the United States, residing at Louisville, in the county of Jefferson and State of Kentucky, have invented a new and useful Toothpick, of which the following is a specification.

My invention relates to that class of toothpicks which have a handle and may be carried in the pocket and used for a long period of time; and the objects of my improvement are, first, adaptability to being inserted between close teeth; second, strength, and, third, adaptability to being carried in the pocket.

I attain these objects by means of the mechanism illustrated in the accompanying drawings, in which—

Figure 1:
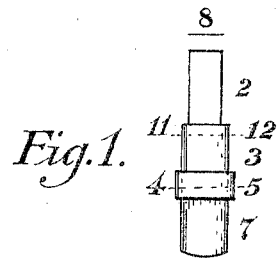
Figure 2:
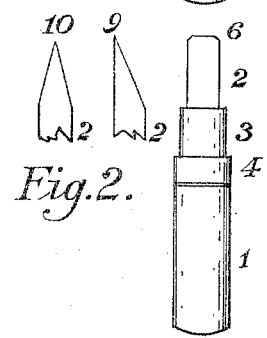
Figure 3:
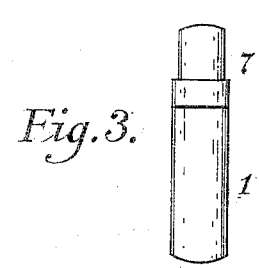
Figure 4:
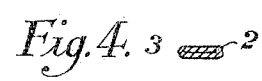
Figure 5:
Figure 6:
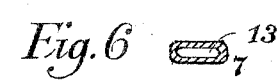

Figure 1 is a side view of the stock which carries the blade, together with an end view of the blade; Fig. 2, a side view of the entire device put together ready for use with two alternative shapes of point; Fig. 3, a side view of the entire device closed, so as to be carried in the pocket; Fig. 4, a section on the line 11 12; Fig. 5, a section on the line 4 5; Fig. 6, a section showing the socket in the handle, and Fig. 7 an edge view showing the blade inserted between two teeth at an angle.

Similar numerals refer to similar parts throughout the several views.

The handle 1 and the blade 2 constitute the body of the device. The handle 1 is flat and made of any suitable substance, such as aluminium or tortoise-shell, and is hollow, so as to receive the blade 2. One end of handle 1 has an opening 13, which forms a socket for the enlarged portion 3 just beyond the blade 2. The portion 4 is of the same size and shape as handle 1. The portion 7 is of the same size as 3 and also, like 3, adapted to fit snugly into socket 13 of handle 1. On the part 4 a square shoulder is formed which abuts against the end of 1 and forms a flush joint therewith.

8 is the end of the thin blade 2.

9 and 10 are alternative shapes of point with which the instrument may be made. Four shapes are shown—square in Fig. 1, with corner cut off at 6 and 9 and 10.

Figure 7:
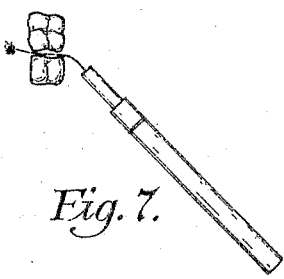

The blade 2 may be made of any material that is hard and springy. I prefer to make it of spring-steel, the thinnest practical, in order that it may pass between teeth which are quite close together. The blade being quite wide—one-fourth of an inch, more or less—is strong and may be pushed with considerable force, and being thin it conforms to the curves between the teeth and may be inserted where the handle must be held at an angle to the plane of the opening, as shown in Fig. 7.

To use my invention, the blade is removed from the handle and the end 7 inserted into the socket in the handle. The blade is then inserted between the teeth and obstructions thus removed. After using the blade may be inserted into the handle, where it is protected from corrosion or other injury.

Having thus described my invention so that any one skilled in the art pertaining thereto may make it and any one may understand its use, what I claim as my invention, and desire to secure by Letters Patent, is—

In a toothpick, the combination of a flat handle having a tenon with a square shoulder on one or both ends thereof, a laminal-steel-spring blade permanently secured in one end of said handle, and a hollow flat sheath, entirely separable from said handle, adapted to cover said blade and fit and stick by friction on the tenon or tenons of aforesaid handle, substantially as specified.

WILLIS WILKINS BARNES

Witnesses:
 I. B. WEBSTER,
 ABRAHAM KNOBEL.